US009577401B2

(12) United States Patent
Shaw et al.

(10) Patent No.: US 9,577,401 B2
(45) Date of Patent: Feb. 21, 2017

(54) SYSTEMS AND METHODS OF ACHIEVING HIGH BRIGHTNESS INFRARED FIBER PARAMETRIC AMPLIFIERS AND LIGHT SOURCES

(71) Applicants: Leslie Brandon Shaw, Woodbridge, VA (US); Jasbinder S. Sanghera, Ashburn, VA (US); Ishwar D. Aggarwal, Charlotte, NC (US); Daniel J. Gibson, Cheverly, MD (US); Frederic H. Kung, Alexandria, VA (US)

(72) Inventors: Leslie Brandon Shaw, Woodbridge, VA (US); Jasbinder S. Sanghera, Ashburn, VA (US); Ishwar D. Aggarwal, Charlotte, NC (US); Daniel J. Gibson, Cheverly, MD (US); Frederic H. Kung, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/814,848

(22) Filed: Jul. 31, 2015

(65) Prior Publication Data
US 2015/0340831 A1 Nov. 26, 2015

Related U.S. Application Data

(63) Continuation of application No. 12/505,498, filed on Jul. 19, 2009, now Pat. No. 9,099,835.

(51) Int. Cl.
*H01S 3/067* (2006.01)
*H01S 3/17* (2006.01)
(Continued)

(52) U.S. Cl.
CPC ....... *H01S 3/06754* (2013.01); *G02B 6/02295* (2013.01); *G02B 6/02347* (2013.01);
(Continued)

(58) Field of Classification Search
CPC .. H01S 3/171; H01S 3/06754; H01S 3/06741; H01S 3/094096; G02B 6/02295; G02B 6/02314; G02B 6/02342; G02B 6/02347; G02B 6/02357; G02B 2207/114
See application file for complete search history.

(56) References Cited

U.S. PATENT DOCUMENTS 6,917,741 B2 * 7/2005 Fekety ................... B82Y 20/00
 216/56
6,928,227 B2 * 8/2005 Shaw ...................... H01S 3/063
 359/334

(Continued)

*Primary Examiner* — Eric Bolda
(74) *Attorney, Agent, or Firm* — US Naval Research Laboratory; Rebecca L. Forman (57) ABSTRACT

Fiber optic amplification in a spectrum of infrared electromagnetic radiation is achieved by creating a chalcogenide photonic crystal fiber (PCF) structure having a radially varying pitch. A chalcogenide PCF system can be tuned during fabrication of the chalcogenide PCF structure, by controlling, the size of the core, the size of the cladding, and the hole size to pitch ratio of the chalcogenide PCF structure and tuned during exercising of the chalcogenide PCF system with pump laser and signal waves, by changing the wavelength of either the pump laser wave or the signal wave, maximization of nonlinear conversion of the chalcogenide PCF, efficient parametric conversion with low peak power pulses of continuous wave laser sources, and minimization of power penalties and minimization of the need for amplification and regeneration of pulse transmissions over the length of the fiber, based on a dispersion factor.

2 Claims, 11 Drawing Sheets

(51) Int. Cl.
G02B 6/02 (2006.01)
H01S 3/094 (2006.01)
H01S 3/108 (2006.01)

(52) U.S. Cl.
CPC ...... *G02B 6/02357* (2013.01); *H01S 3/06741* (2013.01); *H01S 3/094096* (2013.01); *H01S 3/1083* (2013.01); *H01S 3/171* (2013.01); *G02B 6/02342* (2013.01)

(56) References Cited

U.S. PATENT DOCUMENTS

| | | | |
|---|---|---|---|
| 7,133,590 B2* | 11/2006 | Shaw | G02B 6/02214 359/332 |
| 2003/0161599 A1* | 8/2003 | Broderick | C03B 37/01205 385/125 |
| 2003/0215199 A1* | 11/2003 | Aitken | G02B 6/02214 385/122 |
| 2004/0125434 A1* | 7/2004 | Kumar | G02F 1/395 359/330 |
| 2005/0105867 A1* | 5/2005 | Koch, III | G02B 6/02338 385/125 |
| 2008/0130100 A1* | 6/2008 | Babich | H01S 3/06754 359/341.3 |

* cited by examiner

Dispersion curve for an $As_2S_3$ PCF with $\Lambda = 3$ μm and $d/\Lambda = 0.3$.

FIG. 4

Phase matching curve for the $As_2S_3$ PCF with $\Lambda = 3$ μm and $d/\Lambda = 0.3$

As₂Se₃ PCF preform and fiber structure drawn from preform

Dispersion curve for the $As_2Se_3$ PCF structure drawn from the preform illustrated in FIG. 6 above.

FIG. 7

Phase matching curve for the $As_2Se_3$ PCF structure drawn from the preform illustrated in FIG. 6 above.

SYSTEMS AND METHODS OF ACHIEVING HIGH BRIGHTNESS INFRARED FIBER PARAMETRIC AMPLIFIERS AND LIGHT SOURCES

CROSS REFERENCE TO RELATED APPLICATIONS

The present application is a continuation of U.S. Ser. No. 12/505,498, filed in the U.S. on Jul. 19, 2009, the entire disclosure of which is incorporated by reference herein.

TECHNICAL FIELD

The present invention relates generally to optical communications networks, and more particularly to obtaining efficient tunable infrared light (IR) sources comprising optical fiber amplifiers for achieving high brightness IR sources.

BACKGROUND

Parametric amplification in a glass optical fiber is a third order nonlinear process dependent upon $\chi^{(3)}$ third order nonlinearity properties of the glass. Parametric amplification operates by the process of four wave mixing involving the interaction of four optical waves. In parametric amplification processes, one and/or two laser pump and/or signal pump waves pumped at frequencies $\omega_1$ and/or $\omega_2$ amplify a signal wave at a frequency $\omega_3$ and generate an idler wave at a frequency $\omega_4$. When a given parametric amplification process has a single (i.e., one) laser pump and/or signal pump wave, then $\omega_1=\omega_2$. The frequencies of the signal wave and the idler wave are related to the frequencies of the laser pump wave and/or signal pump wave by the relation represented as: $\omega_3+\omega_4=\omega_1+\omega_2$.

Parametric amplification has been demonstrated in media of varying compositions, such as silica fiber at near IR wavelengths and visible light wavelengths; however, parametric amplification has not been achieved in the mid IR wavelengths. Therefore, the need exists for fiber optic media of varying compositions that will facilitate parametric amplification in the mid IR wavelengths. Furthermore, in order to utilize parametric conversion to generate light in the mid IR wavelengths, a medium which is transparent in the mid IR wavelengths is necessary. Chalcogenide glass fiber is such a medium and has a wavelength transmission range of from about 0.8 micrometers to about 14 micrometers (μm), depending upon the composition of the chalcogenide glass fiber.

Efficient parametric amplification requires light transmitting media having qualities providing high fiber nonlinearity effects. Therefore, the need exists for fiber optic media having qualities providing high fiber nonlinearity effects. Chalcogenide glasses have demonstrated third order ($\chi^{(3)}$) nonlinearities, approximately 900 times higher than silica. Thus, fibers made from chalcogenide glasses demonstrate efficient nonlinear conversion characteristics.

Photonic crystal fiber is optical fiber whose guiding solid core region is surrounded by air holes. The solid glass core forms the cladding of the chalcogenide photonic crystal fiber. The air holes create a reduced index cladding which contains light in the solid core region. The advantage of photonic crystal fiber over conventional core/clad fiber is that the dispersion of the fiber can be more easily tailored by manipulating cladding microstructured hole size and periodicity, as well as, core size. In photonic crystal fiber, very small core sizes are obtainable, resulting in increased nonlinearities in the fiber.

Efficient parametric amplification also requires careful control of the dispersion of the fiber to achieve phase matching of the laser pump waves, signal waves and idler waves. In solid core chalcogenide fiber and chalcogenide photonic crystal fiber, efficient parametric amplification can be controlled by (1) the design characteristics of the core of the fiber media and/or (2) the design characteristics of the cladding of the fiber media and/or (3) the selection and design of the material composing the core and/or (4) the selection and design of the material composing the cladding. Therefore, the need exists for a method of controlling the dispersion of the fiber by controlling the selection and design of the core and cladding of the fiber.

There are only a few commercial sources of high brightness infrared (IR) radiation. IR Blackbody sources are highly broadband, but are very low power emitters. Optical Parametric Oscillator (OPO) sources, IR diode lasers, gas lasers, and IR solid sate lasers are complex, bulky, and expensive. There are no known tunable sources in the mid IR wavelength ranges. Tunable sources are desirable for current light detection and ranging (LIDAR), infrared countermeasures (IRCM) and ranged chemical and/or biological sensor systems, and IR illuminators as well as, IR fiber and free space communication systems. Therefore, the need exists for parametric amplifiers in the IR wavelength range having high power tunable IR generators in a simple and efficient configuration.

SUMMARY

Fiber structures, systems and methods provide fiber optic amplification characteristics in a spectrum of infrared electromagnetic radiation is achieved by creating a chalcogenide photonic crystal fiber structure having a radially varying pitch configured and/or formed in a preform, through which the chalcogenide photonic crystal fiber is drawn and/or disposed, thus forming the fiber structure having a core, a cladding and a plurality of air holes surrounding the core. A chalcogenide PCF system and/or structure can be tuned in at least the following ways: During fabrication of the chalcogenide photonic crystal fiber structure, tuning can be accomplished by controlling, the size of the (solid glass) core, by controlling the size of the cladding, and by controlling the hole size to pitch ratio of the chalcogenide photonic crystal fiber, having a radially varying pitch, and tuning can further be accomplished during exercising of the chalcogenide photonic crystal fiber system with pump laser waves and signal waves, by changing the wavelength of either and/or both the pump laser wave and/or the signal wave, associated with a ratio of hole size to pitch conforming to a plurality of size specifications of the preform. In addition, by PCF design and choice of proper pump/signal waves maximization of nonlinear conversion of the chalcogenide photonic crystal fiber, efficient parametric conversion with low peak power pulses or continuous wave laser sources, and minimization of power penalties are obtained.

DETAILED DESCRIPTION OF THE INVENTION

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

Figure 6:
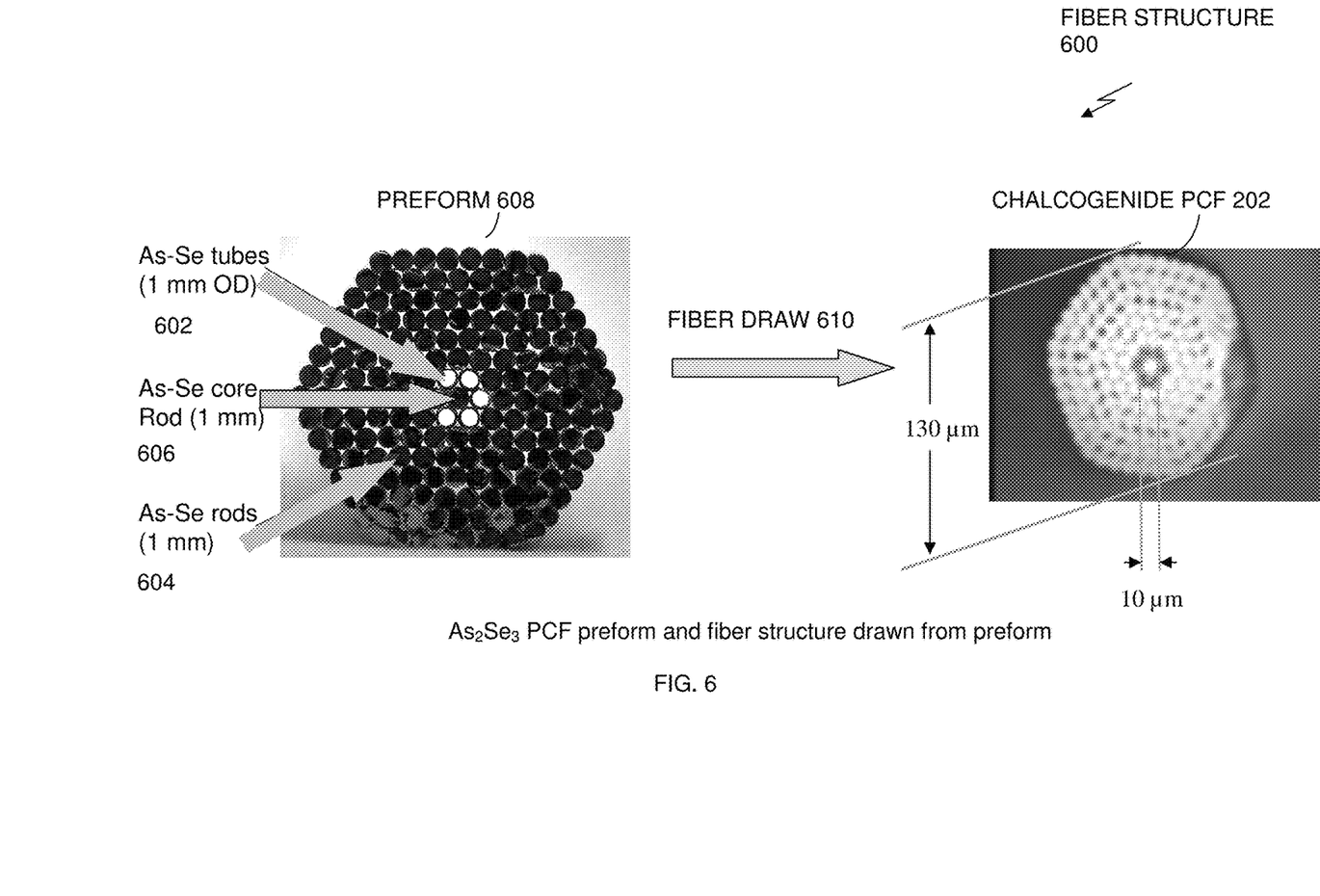
FIG. 6 illustrates an $As_2Se_3$ and fiber structure drawn through the preform having As—Se (arsenic-selenium compound) tubes, rods and core.

Referring to FIG. 1, FIG. 2, FIG. 3, FIG. 6, FIG. 9A, FIG. 9B and FIG. 9C, in accordance with exemplary embodiments, fiber structures, systems and methods provide fiber optic amplification in a spectrum of infrared electromagnetic radiation, achieved by fabricating and/or creating a chalcogenide photonic crystal fiber structures having a pitch 108 which is radially varying configured and/or formed in a preform 608, (where the preform 608 is analogous to a raceway or molding or structural void, see FIG. 6) in and/or through which the chalcogenide photonic crystal fiber 202 is drawn. A plurality of glass rods, where the plurality of glass rods can include glass rods such as As—S and/or As—Se core rod (1 mm) 606 (hereafter "core rod 606") and/or As—S and/or As—Se rods (1 mm) 604 (hereafter "glass rods 604") or other glass compounds are drawn through the preform 608 (drawing the chalcogenide photonic crystal fiber 202 (hereafter the "chalcogenide PCF 202"), core rod 606 and/or glass rods 604 and/or tubes, such as As—S and/or As—Se tubes (1 mm OD) 602 (hereafter "tubes 602") (having an outside diameter of 1 mm), or other compounds through the preform 608 structure is analogous to pulling the chalcogenide PCF 202, glass rods 604, core rod 606 and/or tubes 602 through and/or laying in raceways or molding void structures and/or structural voids). Methods of tuning the chalcogenide photonic crystal fiber system and/or systems, such as chalcogenide photonic crystal fiber system 200 (hereafter "system 200") and chalcogenide photonic crystal fiber system 300 (hereafter "system 300") include: (1) During fabrication of the chalcogenide PCF 202 structure (hereafter the "chalcogenide PCF 202"), controlling, the size of a (solid glass) core 106, controlling the size of the cladding such as As—S glass 104 illustrated in FIG. 1 and/or the As—Se rods, such as glass rods 604 illustrated in FIG. 6 (hereafter the "glass 104" and/or the "glass rods 604"), controlling a geometrical arrangement, and controlling the hole size 110 to pitch 108 ratio of the chalcogenide PCF 202 structure, having a pitch 108, which is radially varying, and/or (2) During exercising of the chalcogenide photonic crystal fiber system and/or systems (such as system 200 and/or system 300) with pump laser waves and signal waves, changing the wavelength(s) of either and/or both a pump laser wave and/or a signal wave.

Furthermore, maximization of nonlinear conversion of the chalcogenide PCF 202, and efficient parametric conversion with low peak power pulses or continuous wave laser sources, and minimization of power penalties are obtained, by chalcogenide PCF 202 design and choice of pump/signal waves.

In a first exemplary embodiment, referring again to FIG. 1, FIG. 2, FIG. 3, FIG. 6, FIG. 9A, FIG. 9B and FIG. 9C, a chalcogenide photonic crystal fiber structure 600 (hereafter the "fiber structure 600") comprise the chalcogenide PCF 202 having the (solid glass) core 106, such as that formed by the plurality of glass rods (such as glass rods 604, see FIG. 6) surrounded by a plurality of air holes (such as air hole 102; see FIG. 1), where the (solid glass), such as core rod 606, see FIG. 6, and/or core 106, see FIG. 1, has a distance Lambda (Λ) forming the pitch 108 between each air hole 102 in the plurality of air holes, and where each air hole such as air hole 102, in the plurality of air holes, has a hole size d (hereafter "hole size 110"). Thus, in exemplary embodiments, at least one glass rod of the plurality of glass rods, such as the glass rods 604, can be a core, such as core 106 and/or core rod 606 of the chalcogenide PCF 202 structure.

In the first exemplary embodiment, one of the ways the chalcogenide PCF 202 structure is tuned, during fabrication, includes controlling, the size of a (solid glass) core 106 and/or core Rod 606, and/or controlling the size of the cladding (such as the glass 104 and/or the glass rods 604), by determining the geometrical arrangement of the hole (where such a geometrical arrangement can be a hexagonal configuration, i.e., a hex pack hole arrangement, and/or tuning can be accomplished by controlling the hole size 110 to pitch 108 ratio of the chalcogenide PCF 202 structure, having the pitch 108 which is radially varying, where the hole size 110 divided by the distance forms the ratio of hole size 110 to pitch 108.

In exemplary embodiments, other geometrical arrangements of holes are configured which are not based on a hex pack hole arrangement. Thus, in exemplary embodiments holes can be geometrically arranged in configurations of rings of holes as well as and/or hex pack hole arrangements and any combination of these and/or other geometrical arrangements of holes and hole size 110.

In exemplary embodiments, other core/cladding compositions can be used extending beyond just the use of photonic crystal fiber. Thus, in exemplary embodiments, some configurations include solid core/cladding used with specific fiber design.

In the first exemplary embodiment, referring to FIG. 6, the chalcogenide PCF 202 structure is formed by drawing the glass rods 604, and/or core rod 606 and/or tubes 602 through the preform 608, see FIG. 6. Additionally, in the first exemplary embodiment, electromagnetic radiation waves can be launched into the chalcogenide PCF 202 and additional tuning operations of one or more wavelengths of the one or more electromagnetic radiation waves can be performed in the chalcogenide PCF 202 to obtain and/or accomplish fiber optic amplification in a spectrum of infrared electromagnetic radiation.

Figure 2:
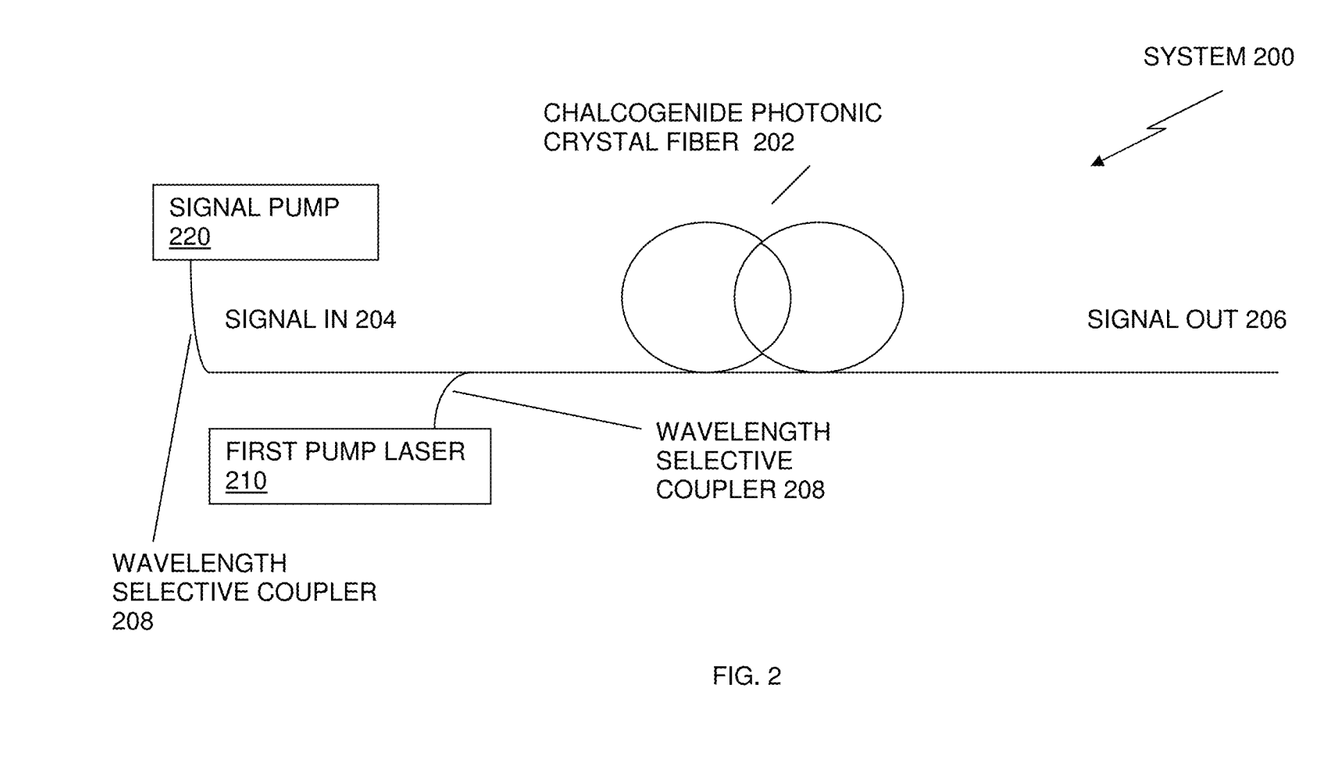
FIG. 2 illustrates a first pump laser coupled to the solid glass core of the chalcogenide photonic crystal fiber system.

In a second exemplary embodiment (i.e., a one pump embodiment), referring to FIG. 2, a chalcogenide photonic crystal fiber system (hereafter "system 200"), further comprises a chalcogenide PCF 202 structure, a first pump laser 210 (such as a semiconductor laser light source or fiber laser) communicatively coupled to either the (solid glass) core 106 or core rod 606 in the chalcogenide PCF 202 structure of the system 200 by a first coupler (such as wavelength selective coupler 208) (hereafter "coupler 208"); and where the first pump laser 210 emits a first wave and a second wave (i.e., a first electromagnetic radiation wave and second electromagnetic radiation wave) at a first oscillation frequency $\omega_1$ and a second oscillation frequency $\omega_2$, respectively, where $\omega_1=\omega_2$.

Figure 5:
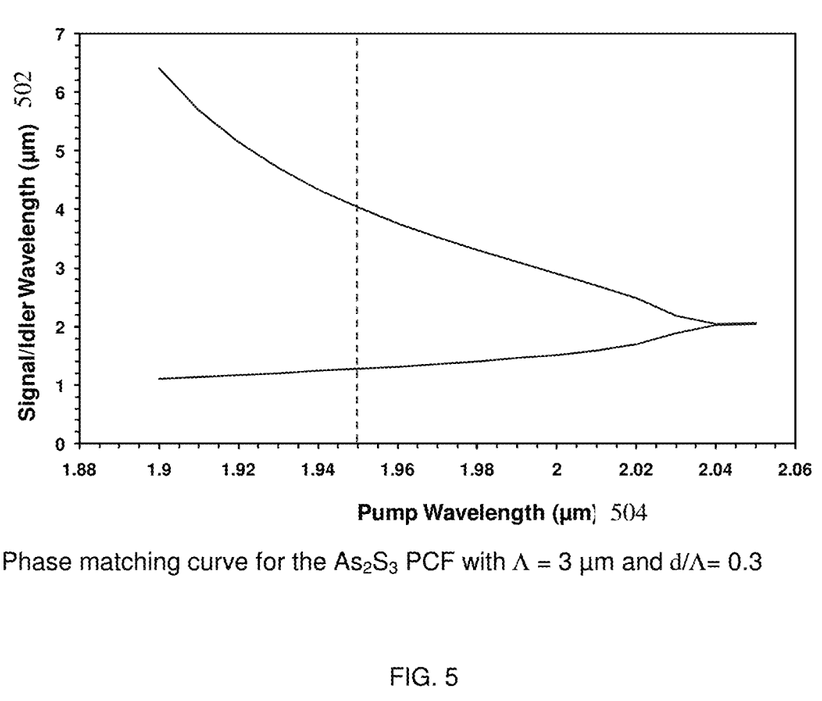
FIG. 5 illustrates a phase matching curve for the $As_2S_3$ photonic crystal fiber structure with a pitch Λ=3, and a distance to pitch ratio of d/Λ=0.3.
Figure 8:
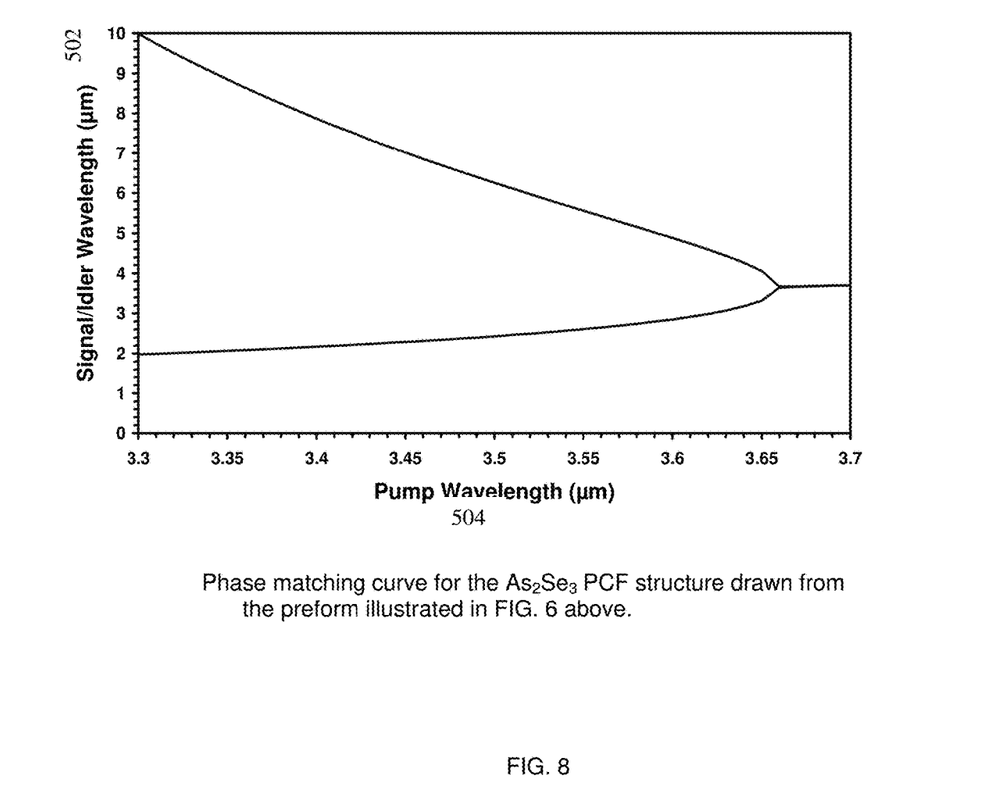
FIG. 8 illustrates a phase matching curve for the $As_2Se_3$ photonic crystal fiber structure illustrated in FIG. 7.
Figure 9A:
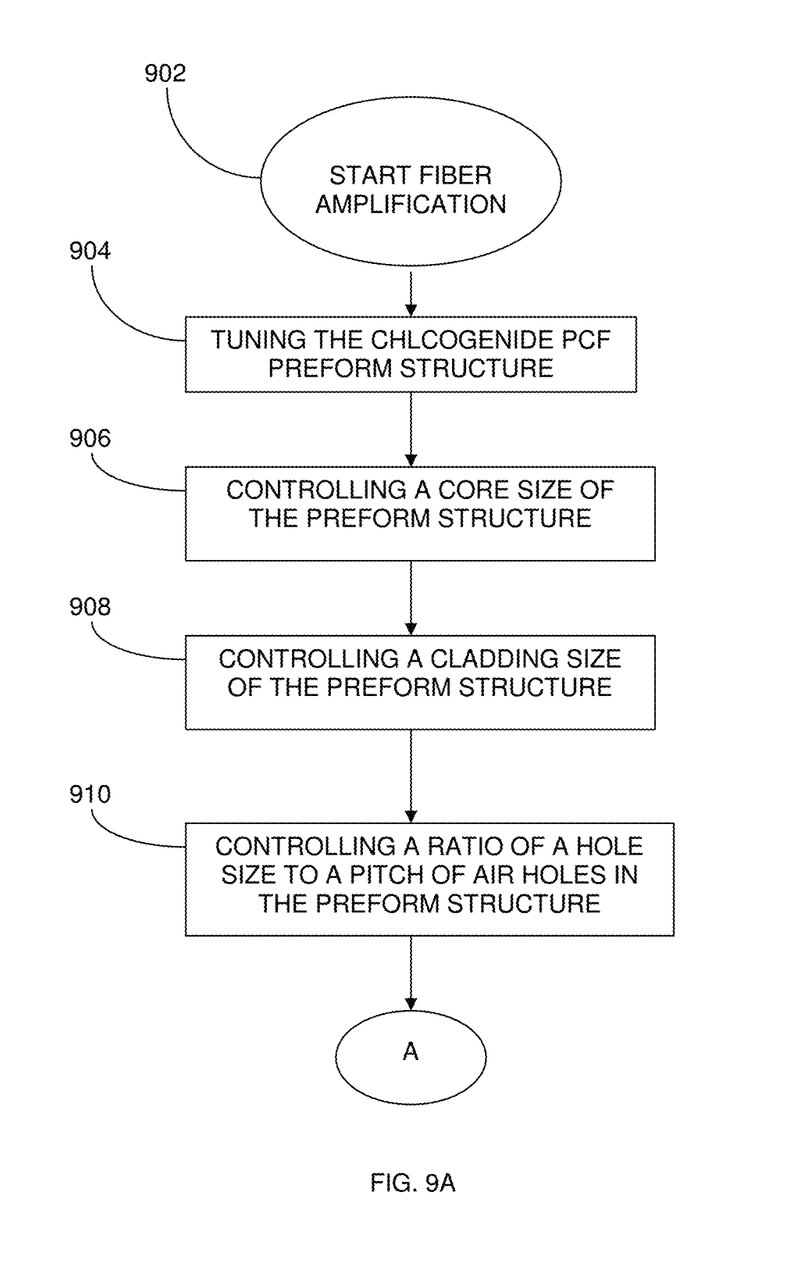
FIG. 9A illustrates operations and/or sub operations of a method of obtaining fiber optic amplification in a spectrum of electromagnetic radiation of a chalcogenide photonic crystal fiber system, as illustrated in FIG. 2 or FIG. 3.
Figure 9B:
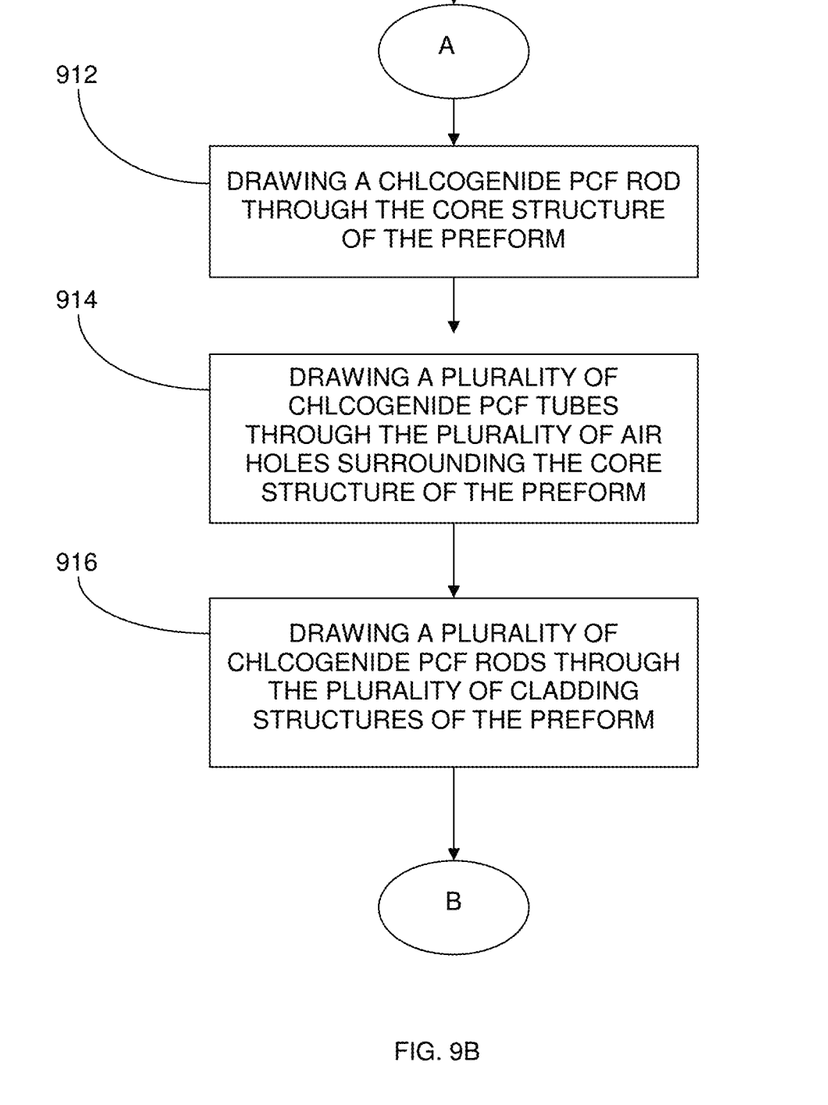
FIG. 9B illustrates a continuation of the operations and/or sub operations of the method of obtaining fiber optic amplification in a spectrum of electromagnetic radiation of a chalcogenide photonic crystal fiber system, as illustrated in FIG. 2 or FIG. 3.
Figure 9C:
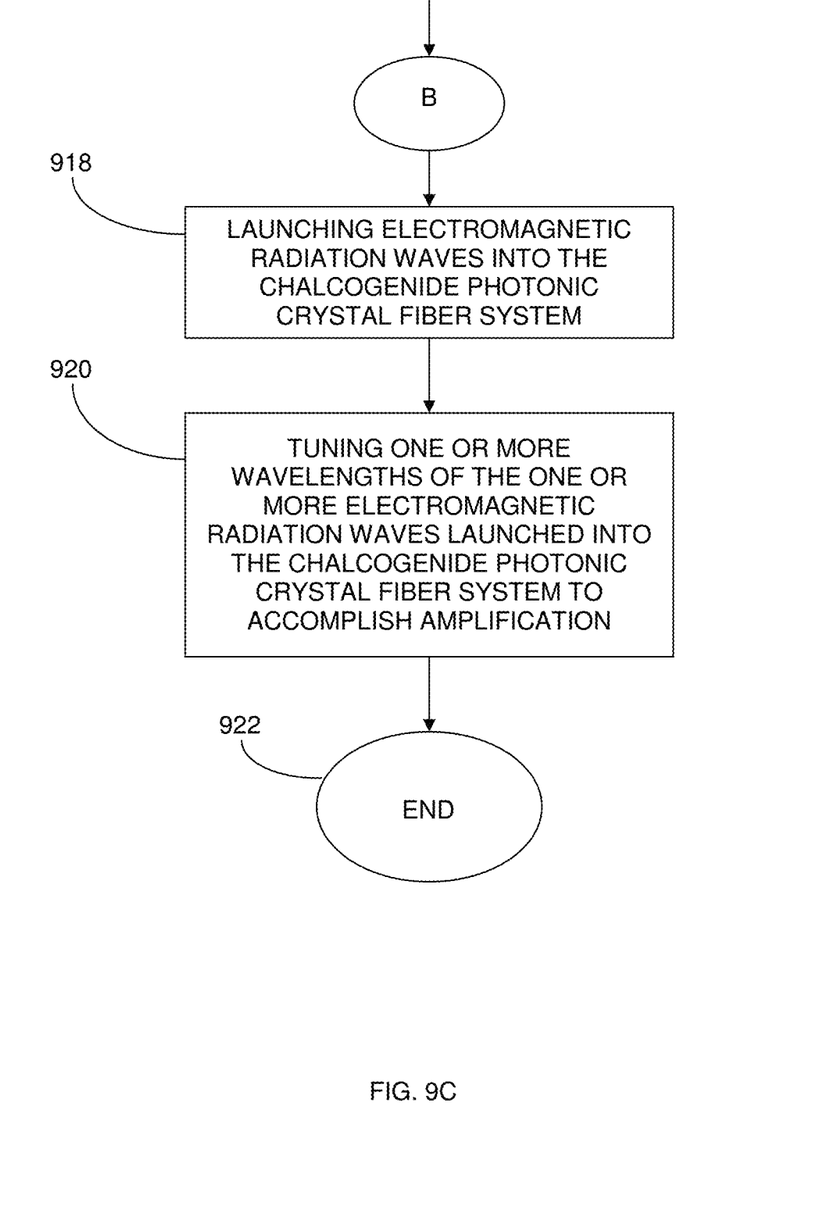
FIG. 9C illustrates the further continuation of the operations of the method of obtaining fiber optic amplification in a spectrum of electromagnetic radiation of a chalcogenide photonic crystal fiber system, as illustrated in FIG. 2 or FIG. 3.

In the second exemplary embodiment, again referring to FIG. 2, the system 200 further comprises a signal pump 220 laser (hereafter "the signal pump 220") communicatively coupled to the (solid glass) core 106 of the chalcogenide PCF 202 by a second wavelength selective coupler (such as the coupler 208"). The signal pump 220, which can be considered a third laser, generates a third electromagnetic radiation wave (i.e., an electrical signal) having a third oscillation frequency $\omega_3$, which is launched into the (solid glass) core of the chalcogenide PCF 202 through the second wavelength selective coupler, such as coupler 208. This third electromagnetic radiation wave (i.e., the electrical signal) interacts with the first and second electromagnetic radiation waves transmissions in the chalcogenide PCF 202. Thus, the first and second electromagnetic radiation waves interacting in the chalcogenide PCF 202 causes amplification of the third electromagnetic radiation wave (i.e., the electrical signal) and causes generation of a fourth electromagnetic radiation wave (i.e., an idler wave having a fourth oscillation frequency $\omega_4$ in a wave mixing phenomenon, based on nonlinearities in the transmission medium) to be generated and transmitted in the chalcogenide PCF 202, where the chalcogenide PCF 202 has a dispersion factor and the dispersion factor causes a first wavelength of the first pump laser wave and a second wavelength of the wave of the first pump laser 210, a wavelength of the electrical signal wave and a wavelength of the idler wave to be phase matched (i.e., which is characterized by k3+k4−k1−k2~0) (see FIG. 4 and FIG. 7 for illustrations of dispersion curves). Phase matching curves (see FIG. 5 and FIG. 8) for the chalcogenide PCF 202 are calculated from the formula:

$$\sum_{n=1}^{\infty} \frac{2\beta_{2n}\Omega^{2n}}{(2n)!} + 2\gamma P = 0; \quad (1)$$

where β (Beta) is a propagation constant at the pump wavelength, where $\beta_{2n}$ represent higher order material dispersion terms at an nth derivative of the propagation constant β, where Ω (Omega) is a frequency shift of the signal wave and the idler wave, where γ (lower case gamma) is a nonlinear interaction coefficient of the chalcogenide photonic crystal fiber; and where P is an incident pump peak power.

In the second exemplary embodiment, frequencies of a first electrical signal electromagnetic wave and an idler electromagnetic wave are related to frequencies of the first pump laser 210 electromagnetic waves by the relation: $\omega_3+\omega_4=\omega_1+\omega_2$, by pumping the first electric signal as a transmission of electromagnetic radiation (characterized as a wavelength of the radiating electromagnetic field or the photon energy of the radiating electromagnetic field or) having a first oscillation frequency (of the radiating electromagnetic field), where the electromagnetic radiation is launched into the (solid glass) core 106 and/or core rod 606 of the chalcogenide PCF 202 through the first coupler (such as the coupler 208), and wherein the transmission of electromagnetic radiation is within the spectrum of electromagnetic radiation of mid IR wavelengths (generated in the chalcogenide PCF 202 by parametric mixing), (where electromagnetic radiation (EMR) in the near infrared (NIR) spectrum have wavelengths between about 750 nanometers to about 2,500 nanometers; EMR in the middle and/or mid infrared (MIR) spectrum have wavelengths between about 2,500 nanometers to about 30,000 nanometers; EMR and in the far infrared (FIR) spectrum have wavelengths between about 30,000 nanometers to about 1 million nanometers (nm)).

Thus, in the second exemplary embodiment, the chalcogenide PCF 202 structure can be constructed, having a (solid glass) core 106 surrounded by the plurality of air holes, such as air hole 102 (see FIG. 1) and formed in a preform 608 including a plurality of As—Se (arsenic-sulfide) rods (i.e., rods composed of arsenic-sulfide compounds or other compounds) such as the glass rods 604 and core rod 606, see FIG. 6, and a plurality of As—Se tubes, such as tubes 602; other tube compounds can also be used). One rod of the plurality of glass rods, such as glass rods 604 and/or core rod 606 is used to form the (solid glass) core 106 of the chalcogenide PCF 202 structure in the system 200 and/or the system 300 (also see FIG. 2, FIG. 3, and FIG. 6), where each As—Se rod of the plurality of As—Se rods can have a diameter of 1 millimeter (mm), where the plurality of air holes surrounding the (solid glass) core 106 is formed by a plurality of As—Se tubes, such as tubes 602, where each tube of the plurality of As—Se tubes has an outside diameter of 1 millimeter (mm), and where the pitch in the chalcogenide PCF 202 is a pitch 108, which is radially varying. However, the 1 mm size rods can be replaced with rods of different sizes. The rods with given sizes are drawn into a given fiber structure; however, the properties of the given fiber are the important considerations, not just the dimensions of the tubes, rods and cores.

In exemplary embodiments, of the fiber structure, the first and second electromagnetic radiation waves in the chalcogenide PCF 202 can have a range of wavelengths from about 0.8 micrometers to about 12 micrometers. However, in exemplary embodiments, the pump wavelengths are not limited; there are designs for longer pump wavelengths and broader tenability.

Figure 1:
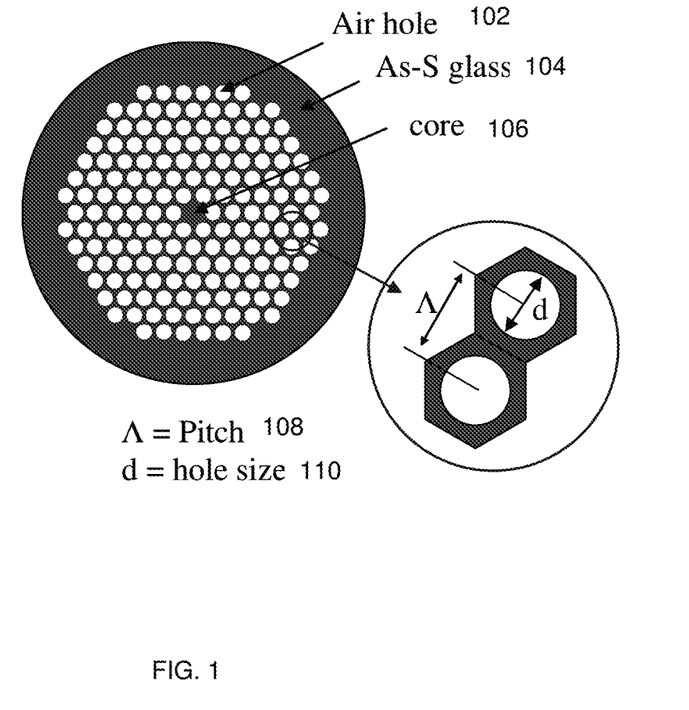
FIG. 1 illustrates an As—S(arsenic-sulfur) glass compound chalcogenide photonic crystal fiber structure.

Referring to FIG. 1, in exemplary embodiments, of the chalcogenide PCF 202 structure, the pitch between each air hole 102 in the plurality of air holes of the chalcogenide PCF 202 can be characterized as:

$$\Lambda = 3 \text{ } \mu m, \quad (2); \text{ and}$$

the ratio for the hole size to pitch in the chalcogenide PCF 202 structure can be characterized as $$d/\Lambda = 0.3 \quad (3).$$

In exemplary embodiments, in association with the chalcogenide PCF 202 structure, the idler wave can have a range of wavelengths from about 2.5 micrometers to about 14 micrometers.

In exemplary embodiments, in the chalcogenide PCF 202 structure, the fourth electromagnetic radiation wave (i.e., the idler wave) transmission has a range of wavelengths of from about 2.5 micrometers to about 14 micrometers.

In exemplary embodiments, in the system, a dispersion curve can be calculated from formulas (2) and (3) resulting in two points of waveguide dispersion at zero dispersion.

Figure 4:
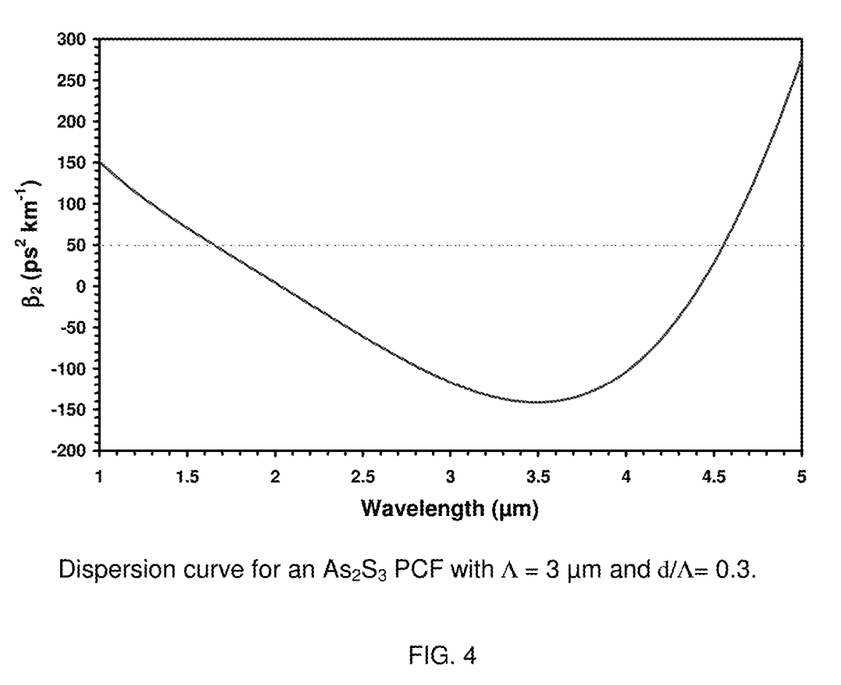
FIG. 4 illustrates a dispersion curve for an $As_2S_3$ photonic crystal fiber structure with a pitch Λ (Lambda)=3, and a distance (d) to pitch ratio of d/Λ=0.3.
Figure 7:
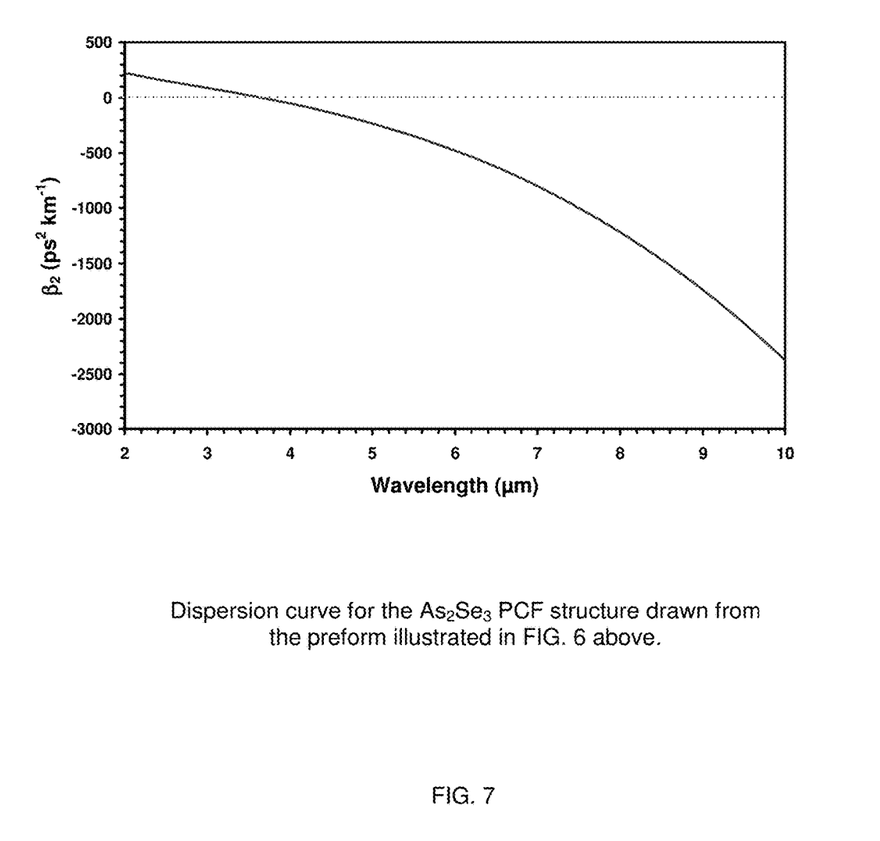
FIG. 7 illustrates a dispersion curve for the $As_2Se_3$ photonic crystal fiber structure drawn from the preform illustrated in FIG. 4.

In exemplary embodiments, referring to FIG. 4 and FIG. 7, regarding the chalcogenide PCF 202 structure a dispersion curve calculated when $\Lambda = 3$ $\mu m$, and $d/\Lambda = 0.3$, results in and/or indicates two points of waveguide dispersion at zero dispersion. However, it is the phase matching in the chalcogenide PCF 202 structure that is important.

In exemplary embodiments, referring to FIG. 5 and FIG. 7, regarding the chalcogenide PCF 202 structure phase matching curve calculated are illustrated showing results in phase matching of signal and idler waves from about 1 to about 6 micrometers, based on pumping in a wavelength range from about 1.9 micrometers to about 2 micrometers.

Figure 3:
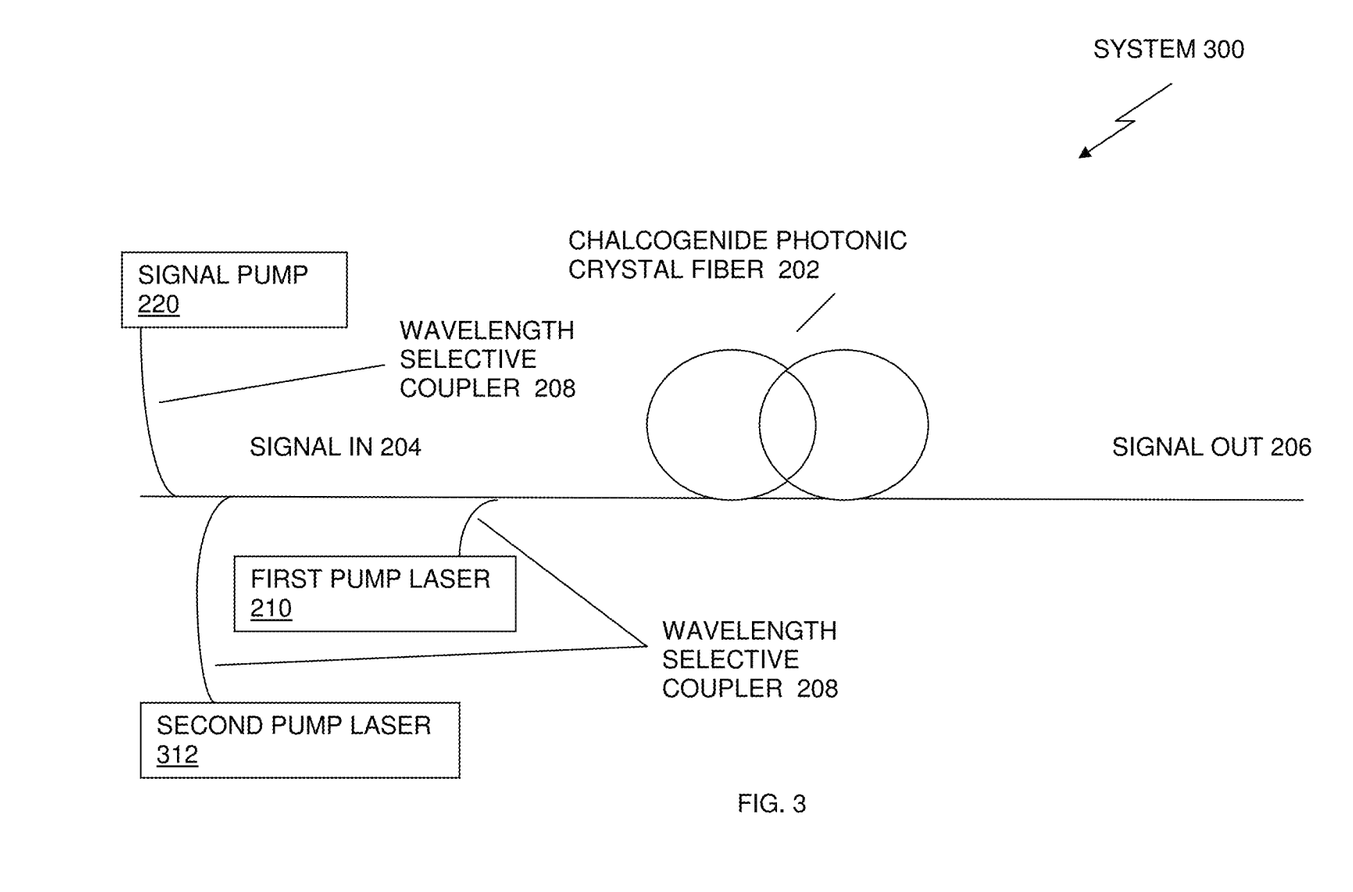
FIG. 3 illustrates the first pump laser and a second pump laser coupled to the solid glass core of the chalcogenide photonic crystal fiber system.

In exemplary embodiments, referring to FIG. 2 and/or FIG. 3, in the chalcogenide PCF 202 structure, either the first pump laser 210 or the second pump laser 312 pumping in the range from about 3.3 micrometers to about 3.6 micrometers results in phase matching in signal and idler waves from about 2 to about 10 micrometers, i.e., where the signal wave is amplified and an idler wave of 10 micrometers will be generated.

In exemplary embodiments, in the chalcogenide PCF 202 structure, when either one or more of the size of the (solid glass) core 106 is controlled and/or the size of the cladding (such as the glass 104 and/or the glass rods 604) is controlled and the pitch of the chalcogenide PCF 202 is controlled (by design parameter requirements), then nonlinear conversion of the chalcogenide PCF 202 is maximized (and facilitates highly efficient parametric conversion with low peak power pulses of continuous wave laser sources).

In exemplary embodiments, in the chalcogenide PCF 202 structure, each of the first electromagnetic radiation wave, the second electromagnetic radiation wave and the third electromagnetic radiation wave has a range of wavelengths from about 0.8 micrometers to about 12 micrometers. However, these wavelengths can be extended beyond or reduced below or fall anywhere within these ranges.

In exemplary embodiments, in the chalcogenide PCF 202 structure, the fourth electromagnetic wave, i.e., the idler wave has a range of wavelengths from about 1 micrometers to about 14 micrometers. However, other wavelengths values will also work.

In exemplary embodiments, in the chalcogenide PCF 202 structure, when one or more of the size of the (solid glass) core 106 is controlled and/or the size of the cladding hole(s) is/are controlled and/or the pitch of the chalcogenide PCF 202 is controlled (by design parameter requirements), then nonlinear conversion of the chalcogenide PCF 202 is maximized (and facilitates highly efficient parametric conversion with low peak power pulses of continuous wave laser sources.

In exemplar embodiments, the frequencies of a first electrical signal electromagnetic wave and an idler electromagnetic wave are related to frequencies of the pump laser(s) electromagnetic wave and/or waves by the relation: $\omega_3 + \omega_4 = \omega_1 + \omega_2$) pumping the first electric signal as an emission and/or a stream of electromagnetic radiation (characterized as wavelength of the radiating electromagnetic field or the photon energy of the radiating electromagnetic field or) having a first oscillation frequency (of the radiating electromagnetic field), wherein the emission of electromagnetic radiation is launched into the (solid glass) core of the chalcogenide photonic crystal fiber through the first coupler, and wherein the emission of electromagnetic radiation is within the spectrum of electromagnetic radiation of mid IR wavelengths (generated in the chalcogenide photonic crystal fiber by parametric mixing), (where electromagnetic radiation (EMR) in the near infrared (NIR) spectrum have wavelengths between about 750 nanometers to about 2,500 nanometers; EMR in the middle and/or mid infrared (MIR) spectrum have wavelengths between about 2,500 nanometers to about 30,000 nanometers; EMR and in the far infrared (FIR) spectrum have wavelengths between about 30,000 nanometers to about 1 million nanometers (nm)).

In exemplary embodiments, the system 200 can further comprise a second pump laser (such as a semiconductor laser light source) communicatively coupled to the (solid glass) core 106 and/or core Rod 606 of the chalcogenide photonic crystal fiber by a third coupler; and wherein the second pump laser pumps the second (electromagnetic radiation) wave at the second oscillation frequency $\omega_2$ and wherein the first pump laser communicatively coupled to the (solid glass) core 106 of the chalcogenide PCF 202 by the first coupler pumps the first electromagnetic radiation wave at the first oscillation frequency $\omega_1$.

In a third exemplary embodiment, a system 300 further comprising a second pump laser (such as second pump laser 312; see FIG. 3). Either the first pump laser 210 and/or the second pump laser 312 can be a semiconductor laser light source. In exemplary embodiments, the first, second and third and/or additional couplers can be; a device and/or devices, such as coupler 208, communicatively coupled to the (solid glass) core 106 and/or core Rod 606 of the chalcogenide PCF 202. Thus, the third coupler, such as the coupler 208, can couple the second pump laser 312 to the chalcogenide PCF 202, where the second pump laser 312 pumps the second (electromagnetic radiation) wave at the second oscillation frequency $\omega_2$ and wherein the first pump laser communicatively coupled to the (solid glass) core 106 and/or core Rod 606 of the chalcogenide PCF 202 by the first coupler, such as the coupler 208, pumps the first electromagnetic radiation wave at the first oscillation frequency $\omega_1$, where the first oscillation frequency $\omega_1$ may or may not equal the second oscillation frequency $\omega_2$.

In the third exemplary embodiment, in the system 300 (i.e., in the two pump embodiment) the chalcogenide PCF 202 includes a (solid glass) core 106 and/or core Rod 606 surrounded by the plurality of air holes, such as Air hole 102, formed in a preform structure, such as the preform 608 including a plurality of As—Se rods, and a plurality of As—Se tubes. Also, in exemplary embodiments, other compositions can be used for the As—Se tubes and/or rods. Thus in exemplary embodiments, As—S tubes and rods can be configured, as well.

In the third exemplary embodiment, in the system 300, a phase matching curve can be calculated indicating phase matching in the signal and idler waves from about 1 to about 6 micrometers, based on pumping in a wavelength range from about 1.9 micrometers to about 2 micrometers.

In the third exemplary embodiment, in the system 300, either the first or second pump laser pumping in the range from about 3.3 micrometers to about 3.6 micrometers results in phase matching in signal and idler waves from about 2 to about 10 micrometers, i.e., wherein the signal wave is amplified and an idler wave of 10 micrometers is generated.

In the third exemplary embodiment, in the system 300, the dispersion factor causes the wavelength of the first pump laser wave, the wavelength of the second pump laser wave, the wavelength of the electrical signal wave and the wavelength of the idler wave to be phase matched, when either/or one or more of a size of the (solid glass) core cladding is controlled and/or a size of the hole is controlled and/or a pitch of the chalcogenide is controlled (by design parameter requirements).

In the third exemplary embodiment, in the system 300, the idler wave has a range of wavelengths from about 1 micrometers to about 14 micrometers.

In exemplary embodiments of system, when one or more of the size of the (solid glass) core (such as the core 106 and/or the core Rod 606) is controlled and/or the size of the cladding (such as the glass 104 and/or the glass rods 604) is controlled and/or the pitch 108 of the chalcogenide PCF 202 is controlled (by design parameter requirements), then nonlinear conversion of the chalcogenide PCF 202 is maximized (and facilitates highly efficient parametric conversion with low peak power pulses of continuous wave laser sources).

In the third exemplary embodiment, phase matching curves (see FIG. 5 and FIG. 8) for the chalcogenide PCF 202 are calculated according to the equation (1) above.

In the third exemplary embodiment, frequencies of a first electrical signal electromagnetic wave and an idler electromagnetic wave are related to frequencies of the first pump laser 210 electromagnetic wave and the second pump laser 312 wave by the relation: $\omega_3+\omega_4=\omega_1+\omega_2$) pumping the first electric signal as a transmission of electromagnetic radiation (characterized as a wavelength of the radiating electromagnetic field or the photon energy of the radiating electromagnetic field or) having a first oscillation frequency (of the radiating electromagnetic field), where the electromagnetic radiation is launched into the (solid glass) core 106 and/or core rod 606 of the chalcogenide PCF 202 through the first coupler (such as the coupler 208), and wherein the transmission of electromagnetic radiation is within the spectrum of electromagnetic radiation of mid IR wavelengths (generated in the chalcogenide PCF 202 by parametric mixing), (where electromagnetic radiation (EMR) in the near infrared (NIR) spectrum have wavelengths between about 750 nanometers to about 2,500 nanometers; EMR in the middle and/or mid infrared (MIR) spectrum have wavelengths between about 2,500 nanometers to about 30,000 nanometers; EMR and in the far infrared (FIR) spectrum have wavelengths between about 30,000 nanometers to about 1 million nanometers (nm)).

In the third exemplary embodiment, when either one or more of the size of the (solid glass) core is controlled and/or the size of the cladding hole is controlled and/or the pitch of the chalcogenide is controlled (by design parameter requirements), then nonlinear conversion of the chalcogenide; photonic crystal fiber is maximized and facilitates and/or results in highly efficient parametric conversion in association with low peak power pulses of continuous wave laser sources.

In the exemplary embodiments, a method of obtaining fiber optic amplification in a spectrum of electromagnetic radiation of a chalcogenide photonic crystal fiber system, includes tuning the chalcogenide photonic crystal fiber system (such as the system 200 and/or the system 300) is by performing sub operations of configuring a preform 608 structure. The sub operations for tuning the chalcogenide photonic crystal fiber system(s) (such as the system 200 and/or the system 300) by configuring the preform include controlling a size of a core structure of the preform 608, controlling a size of a plurality of cladding structures (such as the glass 104 and/or the glass rods 604) of the preform 608, and controlling a ratio of hole size 110 to pitch 108 of each air hole 102 of a plurality of air holes in the preform 608. These sub operations conform to a plurality of size specifications of the core (such as the core 106 and/or the core Rod 606), and the cladding structures (such as the glass 104 and/or the glass rods 604), and the hole size 110 of each air hole 102 of the plurality of air holes in the chalcogenide PCF 202 preform 608 structure. The sub operations for tuning the chalcogenide PCF 202 and the chalcogenide photonic crystal fiber systems (such as the system 200 and the system 300) further include drawing a chalcogenide photonic crystal rod (such as the core 106 and/or the core rod 606) through the core of the preform 608 where the size of the chalcogenide photonic crystal rod (such as the core 106 and/or the core rod 606) conforms to the size of the core void controlled in the preform 608. Further, the sub operations for tuning include, after forming the core of the chalcogenide photonic crystal fiber system, drawing a plurality of chalcogenide photonic crystal tubes such as the tubes 602 through a plurality of air holes (such as the air hole 102) surrounding the core (such as the core 106 and/or the core rod 606), where the plurality of chalcogenide photonic crystal tubes (such as the tubes 602) conform to the size of the hole size 110 of each air hole 102 of the plurality of air holes in the preform 608. The plurality of chalcogenide photonic crystal tubes (such as the tubes 602) form the plurality of air holes (such as the Air hole 102) surrounding the (solid glass) core (such as the core 106 and/or the core rod 606) of the chalcogenide photonic crystal fiber system and/or systems (such as the system 200 and/or the system 300). The sub operations further include drawing a plurality of chalcogenide photonic crystal rods through the plurality of cladding structures of the preform 608 forming a cladding element (such as the glass 104 and/or the glass rods 604) of the chalcogenide photonic crystal fiber system. Continuing the operations of obtaining fiber optic amplification in a spectrum of electromagnetic radiation of a chalcogenide photonic crystal fiber system includes launching at least three electromagnetic radiation waves into the chalcogenide photonic crystal fiber system; and tuning a wavelength and/or one or more wavelengths of an at least one electromagnetic radiation wave of the at least three electromagnetic radiation waves launched into the chalcogenide photonic crystal fiber system, in order to accomplish obtaining fiber optic amplification in the chalcogenide photonic crystal fiber system and/or systems, such as the system 200 and the system 300.

While the exemplary embodiments have been particularly shown and described with reference to preferred embodiments thereof, it will be understood by those skilled in the art that the preferred embodiments have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claims and their equivalents. Any and all references cited herein are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the ordinary skill of the art, readily modify and/or adapt for various applications such specific embodiments, without undue experimentation and without departing from the general concept of the present invention. Therefore, such adaptations and modifications are intended to be within the meaning and range of equivalents of the disclosed embodiments, based on the teaching and guidance presented herein.

What is claimed is:

1. A system of fiber optic amplification in a spectrum of electromagnetic radiation, the system comprising:
    a chalcogenide photonic crystal fiber having a glass core surrounded by a plurality of air holes, wherein the glass core has a distance forming a pitch between each air hole in the plurality of air holes, wherein the pitch is a radially varying pitch, and wherein each air hole in the plurality of air holes has a hole size;
    a first pump laser coupled to the glass core of the chalcogenide photonic crystal fiber by a first coupler; wherein the first pump laser emits a first electromagnetic radiation wave at a first oscillation frequency and a second electromagnetic radiation wave at a second oscillation frequency, and wherein the first oscillation frequency of the first electromagnetic radiation wave equals the second oscillation frequency of the second oscillation wave, and
    a signal laser coupled to the glass core of the chalcogenide photonic crystal fiber by a second coupler, wherein the signal laser emits a third electromagnetic radiation wave having a third oscillation frequency, which is launched into the glass core of the chalcogenide photonic crystal fiber through the second coupler, wherein the third electromagnetic radiation wave interacts with the first electromagnetic radiation wave and the second electromagnetic radiation wave in the chalcogenide photonic crystal fiber, and wherein the first electromagnetic radiation wave and the second electromagnetic radiation wave interacting in the chalcogenide photonic crystal fiber cause parametric amplification of the third electromagnetic radiation wave and cause a fourth electromagnetic radiation idler wave to be generated, wherein dispersion causes a first wavelength of the first electromagnetic radiation wave of the first pump laser, a second wavelength of the second electromagnetic radiation wave, a third wavelength of the third electromagnetic radiation wave from the signal laser and a fourth wavelength of the fourth electromagnetic radiation wave to all be phase matched, wherein parametric amplification is achieved by four wave mixing, and wherein generation of the fourth electromagnetic radiation idler wave is based on nonlinearities in a transmission medium and is related to frequencies of the first, second, third, and fourth electromagnetic radiation waves according to a relationship expressed as:

$$\omega_3 + \omega_4 = \omega_1 + \omega_2$$

where $\omega_1$=the first oscillation frequency;
where $\omega_2$=the second oscillation frequency;
where $\omega_3$=the third oscillation frequency; and
where $\omega_4$=a fourth oscillation frequency.

2. A fiber structure having amplification characteristics in a spectrum of infrared electromagnetic radiation, the fiber structure comprising:
    a chalcogenide photonic crystal fiber structure composed of:
    a preform structure comprising:
    a plurality of glass rods and a plurality of glass tubes;
        wherein the fiber structure further comprises a core of the chalcogenide photonic crystal fiber structure, a cladding, and a plurality of air holes surrounding the core of the chalcogenide photonic crystal fiber structure, wherein a pitch between each air hole in the plurality of air holes is a radially varying pitch, and having amplification characteristics of the fiber structure tuned in the spectrum of infrared electromagnetic radiation, when a size of the core of the chalcogenide photonic crystal fiber structure has been controlled, when a size of the cladding has been controlled, when geometrical arrangement of holes has been controlled, and when a ratio of hole size to pitch has been controlled, wherein the fiber structure further comprises a first pump laser coupled to the core of the chalcogenide photonic crystal fiber structure by a first coupler; wherein the first pump laser emits a first wave and a second wave at a first oscillation frequency and a second oscillation frequency, and wherein the first oscillation frequency equals the second oscillation frequency, wherein the fiber structure further comprises a signal laser coupled to the core of the chalcogenide photonic crystal fiber structure by a second coupler, wherein the signal laser coupled to the chalcogenide photonic crystal fiber structure by the second coupler generates a third electromagnetic radiation wave having a third oscillation frequency, which is launched into the core of the chalcogenide photonic crystal fiber structure through the second coupler, wherein the third electromagnetic radiation wave interacts with a first electromagnetic radiation wave and a second electromagnetic radiation wave of the at least one electromagnetic radiation wave launched into the fiber structure of the chalcogenide photonic crystal fiber structure, and wherein the first electromagnetic radiation wave and the second electromagnetic radiation wave interacting in the chalcogenide photonic crystal fiber structure cause amplification of the third electromagnetic radiation wave and cause a fourth electromagnetic radiation wave to be generated and transmitted in the chalcogenide photonic crystal fiber structure, wherein the chalcogenide photonic crystal fiber structure has a dispersion factor, wherein the dispersion factor causes a first wavelength of the first electromagnetic radiation wave of the first pump laser and a second wavelength of the second electromagnetic radiation wave of the first pump laser, a third wavelength of the third electromagnetic radiation wave and a fourth wavelength of the fourth electromagnetic radiation wave to be phase matched, wherein amplification is achieved by four wave mixing, and wherein generation of the fourth electromagnetic radiation wave is based on nonlinearities in a transmission medium and is related to frequencies of the first electromagnetic radiation wave according to a relationship expressed as:

$\omega_3+\omega_4=\omega_1+\omega_2$; and $\omega_1=\omega_2$;

where $\omega_1$=the first oscillation wave frequency, associated with the first pump laser;
where $\omega_2$=the second oscillation wave frequency, associated with the first pump laser;
where $\omega_3$=the third oscillation wave frequency, associated with the signal laser and further associated with amplification of the third electromagnetic radiation wave; and
where $\omega_4$=the fourth oscillation wave frequency and is the idler wave, based on nonlinearities in the transmission medium.

* * * * *